Patented Dec. 14, 1948

2,456,191

UNITED STATES PATENT OFFICE 2,456,191

AQUEOUS UREA FORMALDEHYDE RESIN FOR STABILIZING TEXTILES

Philip Stanley Hewett, Royal Oak, Mich., assignor to Reichhold Chemicals, Inc., Detroit, Mich.

No Drawing. Application June 17, 1944, Serial No. 540,883

3 Claims. (Cl. 260—29.4)

1

This invention relates to improved methylolamine resins especially adapted for the treatment of cellulosic textile materials, and more particularly to the preparation of urea-formaldehyde water-dispersible resins possessing unique and desirable properties. I am aware that there have been many disclosures relating to water-soluble urea-formaldehyde resins and water-dispersible resins which might appear superficially similar, but none of them teaches the actual process or product which is outlined in this present specification. Even assuming that one or more of the individual steps involved in the process herewith outlined may have been already included in one or more disclosures on the general subject of urea-formaldehyde resins, it has been found that the particular sequence of the operations, as outlined in the present specification, makes for the outstanding success of the entire process and of the final product. Furthermore, even though the identical ingredients employed in the process were known to the art, but without the proper sequence of steps set forth in the process, the final resin solution and dried resin film would be of relatively little use. An outstanding characteristic of the present improvement is the commercial success with which it has met as compared to earlier attempts of others.

I am familiar with MacDonough U. S. Patent No. 2,034,479, dated March 17, 1936, which discloses the condensation of formaldehyde and urea at a ratio of 2 to 1 in the presence of acetic acid with subsequent addition of NaOH which forms an equivalent of sodium acetate. In the patent specification (page 1, column 1, line 49, to page 1, column 2, line 12) the patentee states that he eliminates the necessity of distilling off volatile alkali which, as he says, is a subsequent danger.

On the contrary, as pointed out in the present specification, a characteristic feature of the present invention is the use of a volatile alkali simultaneously with chosen buffers. MacDonough preferably maintains his entire process in a pH range of 3–5 which is too acid for the purposes of the present invention and causes too rapid a formation of resin for entire safety, and when operating in accordance with the teaching of MacDonough I find it impossible to obtain the type of uniform molecular weight distribution

2 which results from following the teaching of the present disclosure.

The resin described in the present specification has many outstanding properties, one of the most unique being of dimensionally stabilizing cellulosic textile compositions.

The process of the present invention is characterized by the following important features:

1. The effective range of composition is at a ratio of 1.9 to 2.1 mols of formaldehyde to 1 mol of urea. Lower ratios can be prepared by slight modifications of this teaching, but the life of the resin solution is greatly impaired. At higher ratios, the resins give off large amounts of obnoxious formaldehyde fumes and possess inferior water-resistance.

2. The use of special buffers not only eliminates the necessity of employing automatic pH control instruments during manufacture, but also eliminates the necessity of the addition of acid to regulate to the desired pH gradient during the cooking within the range of from above 7 to slightly above 5. The use of buffers in the present case, however, is simultaneous with the use of a volatile alkali in such a manner and in such a ratio between the buffers and of the volatile alkali that the initial alkaline-condensed urea-formaldehyde complex gradually becomes acid at a predetermined rate that the pH curve drawn by the needle of the pH recording instrument on the chart automatically follows, and will never deviate far from, a calculated line drawn before the batch is started. The advantage of this automatic decrease in pH without the necessity of addition of acid is obvious not only from the standpoint of better control in the plant by less experienced operators, but there is also much less chance for variation in the process than is ordinarily the case.

3. An important feature of the product of the present invention is the even distribution of molecular weight which tends to be much more uniform than any previous product produced by processes which have been heretofore described in which distribution of molecular size is left largely to chance. The uniform molecular weight distribution is the result of a predetermined gradual decrease of pH, or gradual increase in acidity, or, in other words, results from a carefully controlled pH gradient. Ordinary processes, which necessitate the periodic addition of acid for the purpose of lowering the pH from above 7, cause unevenness of molecular size, especially where the strong acid contacts the reaction mixture, as this causes the sudden local formation of large aggregates of high molecular weight in regions of immediate contact. Although the acid may be soon diluted down by the rest of the water present in the aqueous reaction mixture and the reaction may seem to progress normally, there is an important difference, because large aggregates will have been formed right at the start. It is a well known law of colloid chemistry that in peptization large colloidal particles grow rapidly at the expense of smaller particles. Therefore, it will be apparent that in resin dispersions where initially there are some very large aggregates, when resin processing is terminated there will be found present some extremely large particles and also an even larger number of relatively small particles. The large particles cause premature high viscosity of the resin solution and premature danger of gelation and loss of the batch in spite of the fact that there are also present many relatively low molecular aggregates. With the present process it is possible to advance the uniform resin dispersion to a higher average molecular weight for the same viscosity than is possible with a dispersion which contains both extremely large and extremely small particles.

4. In the ordinary type of urea-formaldehyde dispersions heretofore described, the large particles convert rapidly, leaving numerous small particles unconverted, resulting in relatively poor water-resistance as compared with our uniform dispersion. The water resistance of resins prepared by the present process is accordingly vastly superior to that of similar products on the market today.

5. In treating textiles, the penetration effect of the present product is superior since the large number of medium sized aggregates will penetrate cellulose fibers, whereas in the ordinary heterogeneous resin dispersions not only do the larger aggregates fail to penetrate, causing "dusting off" from the fibers, but the vast number of smaller aggregates fail to convert satisfactorily within the intersticial cellulose fibers.

6. In the specific example set forth herein as illustrative of the process of producing the improved resin, the pH is brought back at the end of the treatment to a range of 7.2–7.6 to increase the stability of the final resin solution. Broadly speaking, it is old to make urea-formaldehyde resin solutions alkaline after they have been prepared, but since this resin is already better on stability than resins prepared by other processes which may appear superficially similar to this, the increase in stability is more outstanding when the step of increasing the alkalinity is employed after a process so well controlled as this.

7. Both the catalyst and buffer in the final product defy chemical analysis by known analytical methods. Therefore, to hope to obtain by analytical means a ratio of the catalyst and buffer appears at present to be futile.

8. Resins of this type constitute a noteworthy advance over materials which have been used in an attempt to give dimensional stability to cellulosic textiles treated therewith, said materials including dimethylol urea and/or urea resins in solution or dispersions but in heterogeneous molecular size.

The invention will be more readily understood by reference to the accompanying specific example, which is intended as illustrative of the inventive thought.

Example

Formula.—810 g. formaldehyde (37% solution), 4 g. technical sodium acetate, 8 g. concentrated C. P. ammonia (28% $NH_3$), 300 g. urea.

The formaldehyde is weighed out into a 3 liter, three-necked Pyrex flask equipped with mechanical agitator, water-cooled reflux condenser and thermometer. With the formaldehyde under agitation, the sodium acetate and then the ammonia are added. When all the sodium acetate has gone into solution and the ammonia dispersed, the weighed urea is added.

Heat is applied, and the temperature built up to 90° C. over a period of thirty minutes. The reacted mixture is maintained at 90° C. for two hours. Vacuum of 23–26" is applied and distillate removed to the extent of 350 g. At this point the resin dispersion is white and turbid and has the following characteristics:

Viscosity (Gardner-Holdt) at 25° C., X—Y.
Non-volatile, 75.0%.
pH, 5.5.
Acid number, less than 1.

The batch is then ready for adjustment of pH to a value of 7.4. This can be done by the use of 5 g. of ammonium hydroxide or by an equivalent amount of caustic or of sodium carbonate. The resin dispersion is now ready for use.

The ratio of buffer to volatile alkali may be varied to secure different results, but in all cases the pre-determination and reproducibility of pH conditions and, therefore, also the uniformity of resin molecular size are secured. This applies not only to the straight urea-formaldehyde resins, as in the example, but also for methylolamine resins obtained by partial or complete replacement of the urea by substituted amines and/or amides.

The resins prepared by the foregoing procedure have not only found application in the textile industry, but have been found to be very valuable adhesives when used in conjunction with starch for laminating paper to produce water-proof solid and corrugated boxboard; they have also found application in the coating of paper to give sheets of increased "wax test" water-proofness, and better printability. Furthermore, they have found application in the preparation of high-wet strength paper sheets; and are useful in the wood industries for the manufacture of glues usable for hot and cold-pressed plywood and veneer.

I claim:

1. A process for producing a stable aqueous urea formaldehyde resinous dispersion which comprises combining urea and aqueous formaldehyde as the sole reacting ingredients in the ratio of 1.9–2.1 mols of formaldehyde per mol of urea, by forming an initially alkaline aqueous solution including in addition to the reacting ingredients a buffer and a volatile alkaline catalyst, then gradually heating the mixture and thereby progressively driving off the volatile alkaline catalyst until a pH of slightly above 5 is obtained, thereby controlling the rate of reaction to secure a stable resinous dispersion of uniform molecular weight distribution, and thereupon discontinuing the application of heat and stabilizing the final resinous dispersion.

2. A stable turbid water-dispersible resinous product produced according to claim 1, suitable for use in dimensionally stabilizing cellulosic textiles against washing.

3. A process for producing an unmodified urea formaldehyde resin which comprises combining urea and formaldehyde as the sole reacting ingredients in the ratio of 1.9-2.1 mols of formaldehyde per mol of urea, by forming an initially alkaline aqueous solution including in addition to the reacting ingredients a buffer consisting of sodium acetate and a volatile alkaline catalyst comprising essentially ammonium hydroxide, then gradually heating the mixture and thereby progressively driving off the volatile alkaline catalyst until a pH of slightly above 5 is obtained, and thereupon discontinuing the application of heat and stabilizing the final resin solution by rendering the same alkaline.

PHILIP STANLEY HEWETT.

REFERENCES CITED

The following references are of record in the file of this patent:

UNITED STATES PATENTS

| Number | Name | Date |
|---|---|---|
| 1,460,606 | Ripper | July 3, 1923 |
| 1,951,994 | Rochet | Mar. 20, 1934 |
| 2,034,479 | MacDonough | Mar. 17, 1936 |
| 2,247,764 | Nevin | July 1, 1941 |
| 2,263,289 | D'Alelio | Nov. 18, 1941 |